United States Patent
Sickenius

(10) Patent No.: US 8,560,357 B2
(45) Date of Patent: Oct. 15, 2013

(54) RETAIL MODEL OPTIMIZATION THROUGH VIDEO DATA CAPTURE AND ANALYTICS

(75) Inventor: Louis Stephen Sickenius, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 43 days.

(21) Appl. No.: 13/222,826

(22) Filed: Aug. 31, 2011

(65) Prior Publication Data

US 2013/0054310 A1 Feb. 28, 2013

(51) Int. Cl.
*G06Q 10/00* (2012.01)

(52) U.S. Cl.
USPC .................................. 705/7; 705/10; 705/14

(58) Field of Classification Search
USPC .................................. 705/7, 10, 14
See application file for complete search history.

(56) References Cited

U.S. PATENT DOCUMENTS

| | | | |
|---|---|---|---|
| 7,925,549 B2* | 4/2011 | Looney et al. | 705/27.1 |
| 2002/0161651 A1* | 10/2002 | Godsey et al. | 705/22 |
| 2003/0088463 A1* | 5/2003 | Kanevsky et al. | 705/14 |
| 2006/0010030 A1 | 1/2006 | Sorensen | |
| 2008/0114633 A1* | 5/2008 | Wolf et al. | 705/7 |
| 2008/0249870 A1* | 10/2008 | Angell et al. | 705/14 |
| 2008/0306756 A1 | 12/2008 | Sorensen et al. | |
| 2010/0013931 A1 | 1/2010 | Golan et al. | |
| 2010/0138037 A1 | 6/2010 | Adelberg et al. | |

FOREIGN PATENT DOCUMENTS

| JP | 2006285409 A | 10/2006 |
|---|---|---|
| JP | 2006293786 A | 10/2006 |

OTHER PUBLICATIONS

Segen et al., "A Camera-Based System for Tracking People in Real Time," IEEE, Proceedings of the 13th International Conference on Pattern Recognition, Aug. 1996, 5 pages.

* cited by examiner

*Primary Examiner* — Nga B. Nguyen
(74) *Attorney, Agent, or Firm* — Yee & Associates, P.C.; David A. Mims, Jr.

(57) ABSTRACT

Product presentations are managed in a retail environment. Responsive to a customer buying a product, an unsold product present along a route traversed by the customer in the retail environment and an actual behavior of the customer while traversing the route, are identified. The unsold product is associated with the product and with an expected behavior to purchase the unsold products based on an actual purchase of the product by the customer.

20 Claims, 9 Drawing Sheets

FIG. 8
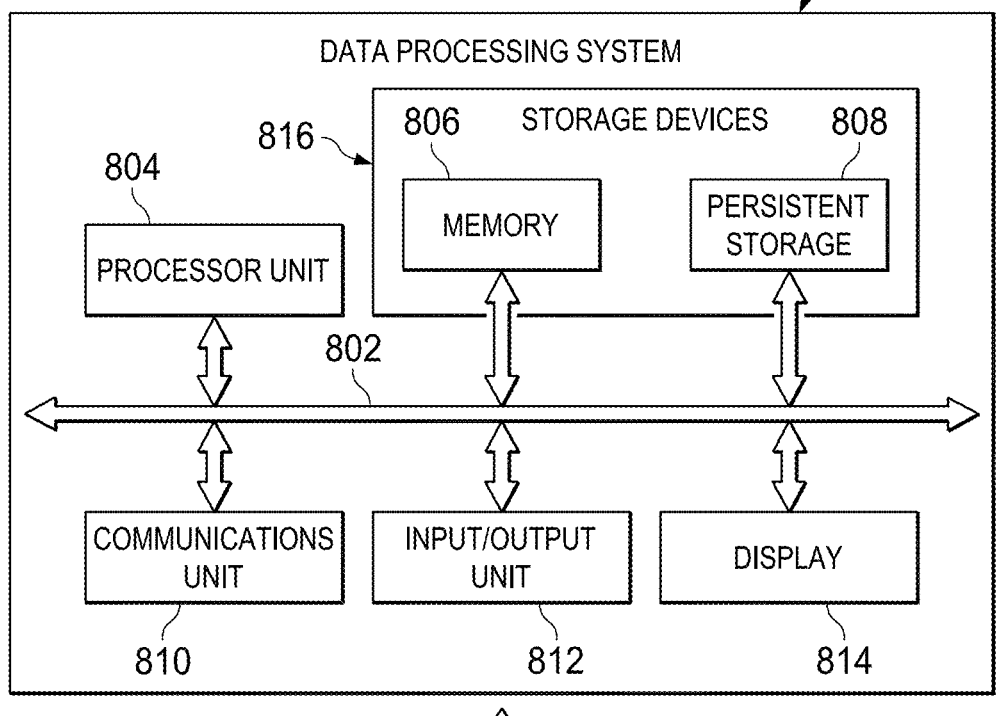
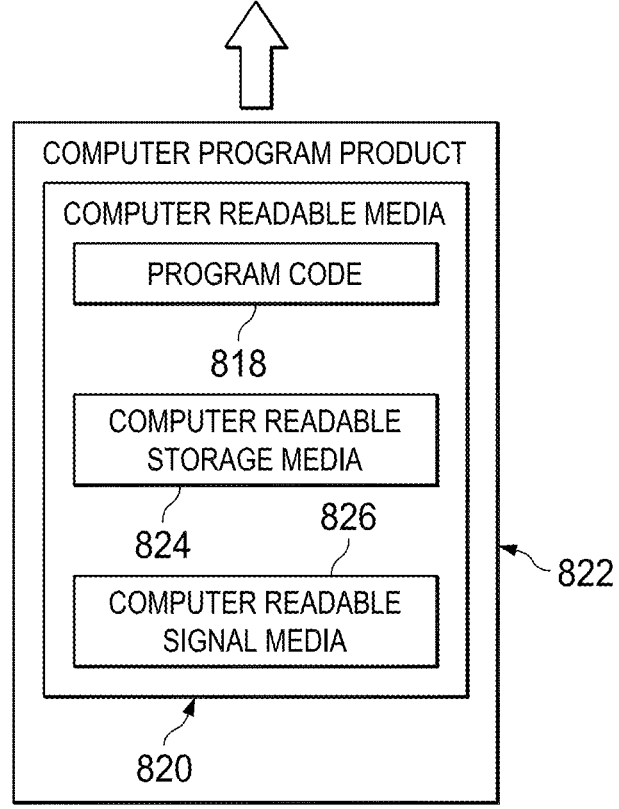

RETAIL MODEL OPTIMIZATION THROUGH VIDEO DATA CAPTURE AND ANALYTICS

BACKGROUND

1. Field

The disclosure relates generally to data processing systems, and more specifically, to managing product presentations using a model of the retail environment and video analytics.

2. Description of the Related Art

Retailers use models to represent physical layouts and product placements in a store. Such models may map pathways, counters, shelves, displays, and sales transaction devices. The models may further identify customer routes through the pathways, counters, shelves, displays, and sales transaction devices. Actual purchases by customers at the sales transaction devices may be correlated to the customer routes. Such models are one of an array of tools that the retailers may use to analyze customer behavior and to modify the physical layouts and product placements based on the purchases made by the customer at the registers.

One type of model used by retailers is a planogram. Definitions of planogram vary, but generally, the term "planogram" means a diagram of fixtures in a store layout showing where products are to be positioned and in some cases may also include identification of actual product and where each actual product is to be positioned in the fixtures. The goal of retailers in using the planogram is to modify presentation of the product by optimizing the relationships of the product to one or more of the pathways, counters, shelves, displays and sales transaction devices. Modifying product presentation using planograms may comprise trial and error practices, as well as computer modeling programs. Such modeling requires data capture related to customer behavior while the customer is in the store.

Accordingly, it would be advantageous to have a method and apparatus, which takes into account one or more of the issues discussed above, as well as possibly other issues.

SUMMARY

The different illustrative embodiments provide a method, data processing system, and computer program product for managing product presentations. Responsive to a customer buying a product, an unsold product present along a route traversed by the customer in the retail environment and an actual behavior of the customer while traversing the route, are identified. The unsold product is associated with the product and with an expected behavior to purchase the unsold product based on an actual purchase of the product by the customer.

BRIEF DESCRIPTION OF THE SEVERAL VIEWS OF THE DRAWINGS

FIG. 8 is an illustration of a data processing system in accordance with an illustrative embodiment.

DETAILED DESCRIPTION

Figure 1:
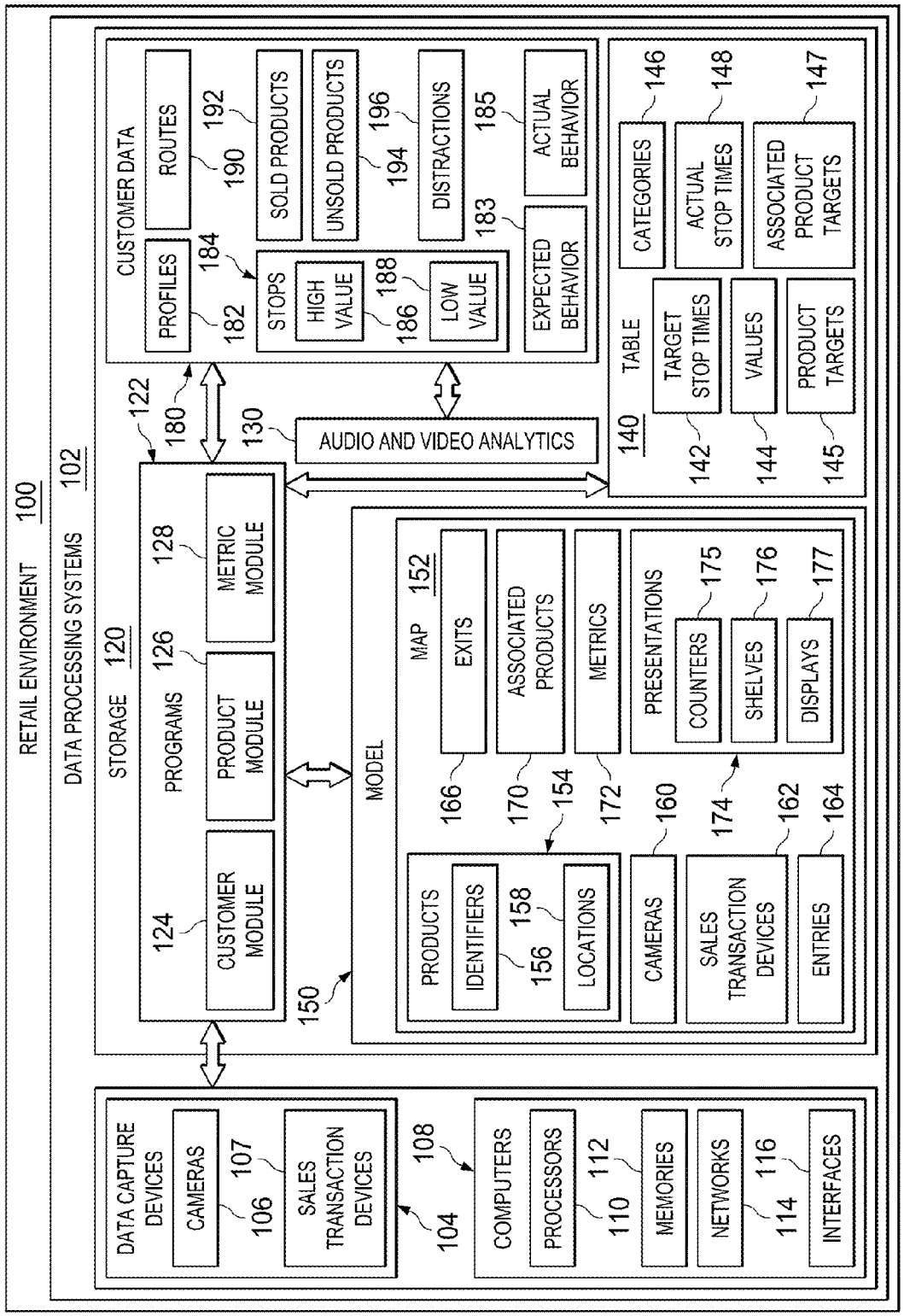
FIG. 1 is a block diagram of a retail environment depicted in accordance with an illustrative embodiment.

The illustrative embodiments recognize and take into account one or more different considerations. For example, the illustrative embodiments recognize and take into account that a customer's behavior in a store will affect the amount of purchases in the store. One aspect of customer behavior is the route a customer will take through the layout of the store. While traversing the route, the customer has an opportunity to view a large number of items, some of which the customer may be looking for, and others that may be suggested to the customer in a number of ways. For example, a suggestion may be made by one or more of the products the customer purchases. Alternatively, such suggestions may be made or enhanced by promotional materials and techniques employed by the retailer to lead the customer to purchase the related product. As used herein, "a number" means one or more.

Furthermore, such promotional materials and techniques may be planned and mapped in a display portion of the model. The manner of making such suggestions may be included in a presentation of the product, the unsold product, or a combination of both. Therefore, the illustrative embodiments recognize and take into account that for product sold to the customer, there may be one or more unsold and associated products that might have been sold had the unsold product been displayed in an area where the customer spent time browsing the products on display. Thus, a model, such as a planogram, may be used to modify a presentation of an unsold product to increase future sales of the unsold product. The modification of the presentation may include creating or modifying a presentation of the product, the unsold product, or both. The presentation may be modified by adding or modifying a display at a location of the purchased product, or the unsold product, to suggest to the customer a need or desire to purchase a related unsold product.

The illustrative embodiments also recognize and take into account that a customer may make one or more stops during customer traversal of a route in a store. Such stops may be referred to as "shopper dwell" locations. As used herein, the term "stop" means any location at which a particular customer stays in the location for more than a threshold amount of time. For example, a stop may be identified when a customer stops walking and remains in a location for five seconds. As used herein "dwell time" shall mean a cumulative time spent by a number of shoppers over a measured period. Thus, a location may be identified as a "low value" dwell space, when a cumulative "dwell time" does not correlate with a corresponding high volume purchase of products positioned in proximity of the "dwell space." Correspondingly, a location may be identified as a "high value" dwell space, when a cumulative "dwell time" does correlate with a corresponding high volume purchase of products positioned in proximity of the "dwell space." Actions taken may include increased signage, product samples, or placing higher profit products at the high value locations.

The illustrative embodiments recognize and take into account that products that a customer purchases may be identified at a sales transaction device and that a correlation may be made between the purchases identified at the sales transaction device and the amount of time an individual customer spends at stops. For example, if a customer were to spend an amount of time along a route in the store at a "stop," but the purchases did not have a high correlation to the amount of time spent at the stop, the location of the "stop" would be identified as a "low value stop" for that customer. In this example, the greater the amount of time spent at the stop, the lower the value of the stop would be for that customer. Likewise, if the customer were to spend an amount of time along customer route at a "stop," and the purchases correlating with that stop location did have a high purchase value, the location of the "stop" would be identified as a "high value stop" for that customer. In this example, the lesser the amount of time spent at the stop, the higher the value of the stop for the customer. The desired metric therefore would indicate a low stop time correlating to high value at sales transaction device for the product set within that stop location. The undesired metric would indicate high value stop time correlating to no or low value at the sales transaction device for the product set within that stop location. Thus, analyzing a model such as a planogram may enable one or more determinations to be made as to elements contributing to a stop achieving a high value designation. Such elements may then be applied in modifying the model for products such as unsold products as discussed above, or for other applications within the retail location as appropriate.

The illustrative embodiments recognize and take into account that such high value "stops" or "dwell locations" may be enhanced by correlation with un-purchased products associated with those products identified as purchases and purchase behavior by the customer as determined at the sales transaction device. The illustrative embodiments recognize and take into account that metrics may be calculated for the "stops" or "dwell locations" so that computers may rearrange the model and issue instructions for conforming actual locations to the changed model.

Such metrics may measure an interaction of a display, a time at a stop, and a sale of a product at a sales transaction device to indicate a positive or a negative impact of the display. The display may comprise audio promotions, signage, or other audio and/or visual promotions related to a particular product.

The illustrative embodiments recognize and take into account that a retailer may desire to optimize a model so that a lowest possible time at a stop may achieve a highest possible profit from sales of products at the stop. Thus, metrics may be calculated based on captured customer data to determine whether a longer time spent at a stop by a customer may result in a purchase of an unsold item associated with the purchased item. Furthermore, actual time spent by a customer at a stop may be compared to target stop times for a stop. Stops may be given values in a table for purposes of comparing actual stop times to target stop times.

The illustrative embodiments recognize and take into account that customers may be expected to purchase certain products when a purchase of a particular product is made. A manager of a retail environment may desire to capture data, and using metrics, optimize a presentation of sold products to increase sales of unsold products that are associated with the sold products by eliminating or decreasing one or more distractions.

Product presentations are managed in a retail environment. The different illustrative embodiments provide a method, data processing system, and computer program product for managing product presentations. Responsive to a customer buying a product, an unsold product present along a route traversed by the customer in the retail environment and an actual behavior of the customer while traversing the route, are identified. The unsold product is associated with the product and with an expected behavior to purchase the unsold product based on an actual purchase of the product by the customer. With reference now to the figures, and in particular, with reference to FIG. 1, an illustrative diagram of a retail environment is provided in which illustrative embodiments may be implemented. It should be appreciated that FIG. 1 is only provided as an illustration of one implementation, and is not intended to imply any limitation with regard to the environments in which different embodiments may be implemented. Many modifications to the depicted environment may be made.

Referring to FIG. 1, a block diagram of retail environment 100 depicted in accordance with an illustrative embodiment. Retail environment 100 may be any environment in which products are sold to customers. Retail environment 100 comprises data processing systems 102 and storage 120. Data processing systems 102 comprises data capture devices 104 and computers 108. Data capture devices 104 comprise cameras 106 and sales transaction device 107. In these examples, the sales transaction devices may take the form of point of sale (POS) registers. The illustrative embodiments recognize and take into account that sales transaction devices may be mobile devices carried by store employees that are used to perform sales transactions. In the case of fixed POS registers, and in the case of mobile devices carried by store employees, data may be transmitted in real time to data processing system 102 for storage in sold products 102 of customer data 180 for use by programs 122 in identifying unsold products 194. Moreover, in the case of mobile devices, positioning systems in the mobile devices may provide data for mapping the location of the mobile sales transaction device. As used herein, sales transaction device means any device capable of recording a sale and sending the data regarding the sale to a data processing system. The illustrative embodiments recognize and take into account that cameras 106 may capture digital images that can be used to identify particular customers and to distinguish between customers so that each customer may be given a unique identifier. For example, once the customer is identified by visual means, such as a facial recognition algorithm, the customer's sales transaction device data can be correlated with the customer's unique identification at the sales transaction device. In addition, should the customer use cash or gift cards, cameras at the sales transaction device can capture images that will identify the customer. Furthermore, cameras 106 may include audio capture so that data captured by cameras 106 may include an audio component.

Computers 108 comprise processors 110, memories 112, networks 114 and interfaces 116. Storage 120 comprises programs 122, audio and video analytics 130, table 140, model 150, and customer data 180. Computers 108 are integrated with the data capture devices and with storage 120 containing programs 122, audio and video analytics 130, table 140, model 150, and customer data 180. Programs 122 comprises customer module 124, product module 126, and metric module 128. Audio and video analytics 130 comprises technology to analyze data captured by cameras 106 in data capture devices 104. Cameras 106 may have audio capability, and therefore, data captured by cameras 106 may include audio as well as video data for analysis by audio and video analytics 130. Table 140 comprises target stop times 142, values 144, categories 146, actual setup times 148, product targets 145 and associated product targets 147. Table 140 resides in storage 120 for use by programs 122 in calculating metrics 172. Values 144 may comprise weights given to categories of products 146, to product targets 145, and associated product targets 147. Values 144 may be used in calculating metrics 172. In these examples, product targets 145 may be a numerical value designating a desired number of sales of a product corresponding to a product target in product targets 145. The product may be one of products 154 mapped by identifiers 156 and locations 158 in map 152 and may be compared to sold products 192 by programs 122 in FIG. 1. Associated product targets 147 may be a numerical value designating a desired number of sales of an associated product corresponding to an associated product target in associated product targets 147. The associated product may be one of associated products 170 mapped in map 152 in model 150 that may be compared to unsold products 194 in customer data 180 by programs 122 in FIG. 1.

Model 150 comprises map 152, associated products 170, metrics 172, and presentations 174. Map 152 comprises products 154, cameras 160, sales transaction devices 162, entries 164, and exits 166. Map 152 may be planograms or any other type of computer generated system for placing products 154, sales transaction devices 162, entries 164, and exits 166. Presentations comprise counters 175, shelves 176, and displays 177. The illustrative embodiments recognize and take into account that a model may map counters, where products that may be viewed horizontally by customers, in two dimensions. Shelves, where customers may view products in different vertical positions as well as possible horizontal positions, may be mapped in three dimensions. In these examples, shelf locations may have different vertical positions. Displays may be positioned in pathways or on counters and mapped in two dimensions or on shelves mapped in two or three dimensions. Displays may comprise a number of audio or visual devices to call a customer's attention to a product. Using such models, a presentation for a particular product may be created by selecting particular counters or shelves along with particular displays and other available factors in the model.

Products 154 comprise identifiers 156 and locations 158. Associated products 170 are products that have a relationship suggesting that if a customer buys one product, the customer is likely to buy associated products.

Customer data 180 comprises profiles 182, expected behavior 183, actual behavior 185, stops 184, routes 190, sold products 192, unsold products 194, and distractions 196. Examples of expected behavior 183 and actual behavior 185 are discussed in FIG. 7 below. Distractions 196 may be factors or events that caused a customer to divert from an expected behavior to purchase an unsold product. Examples of distractions 196 are discussed in FIG. 7 below. Stops 184 may comprise high value 186 and low value 188. High value 186 may be a number or a designator selected by a manager of a retail environment for use in calculating metrics 172. Customer data 180, profiles 182, stops 184, routes 190, sold products 192, and unsold products 194 are determined by customer module 124 and metric module 128.

The illustration of retail environment 100 in FIG. 1 is not meant to imply physical or architectural limitations to the manner in which an advantageous embodiment may be implemented. Other components in addition to, and/or in place of, the ones illustrated may be used. Some components may be unnecessary. Also, the blocks are presented to illustrate some functional components. One or more of these blocks may be combined and/or divided into different blocks when implemented in an advantageous embodiment. For example, storage 120 may be a database in which programs 122, table 140, model 150 and customer data 180, reside. Alternatively, programs 122, table 140, model 150 and customer data 180 may reside separately, or in one or more combinations, on a number of distributed storage devices connected by networks 114. Data capture devices may reside in a number of retail locations connected by networks 114 to processors 110 and memories 112. Computers 108 of data processing systems 102 may comprise any number of processors operably coupled to any number of memories 112 and storage devices such as storage 120 by one or more buses and networks 114. Models may be accessed by one or more managers of one or more retail environments by interfaces 116. Moreover, table 140 is an illustrative embodiment of one way in which data may be arrayed for comparison and for assignments of indications of value for purposes of analysis and calculation of metrics. Data may be stored and linked by pointers or other associations and such data need not be stored in a single table as in the illustrative embodiment of table 140.

Figure 2:
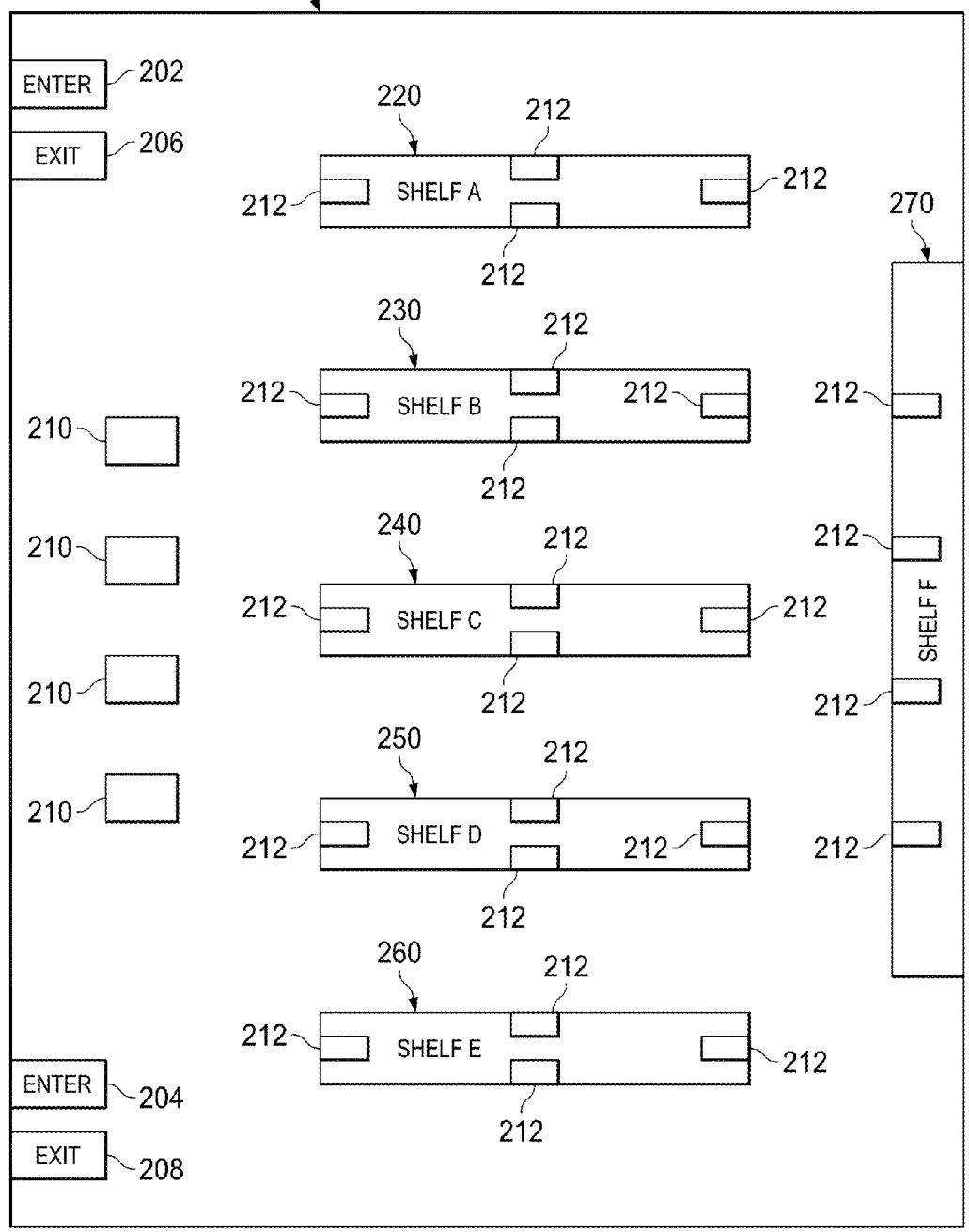
FIG. 2 is an illustrative example of a map in accordance with an illustrative embodiment.

Referring to FIG. 2, an illustrative example of map 200 is depicted in accordance with an illustrative embodiment. Map 200 may be one of map 152 in models 150 of retail environment 100 in FIG. 1. Map 200 may have entries 202 and 204, exits 206 and 208, and points of sale 210. Map 200 may have a number of shelves. In the illustrative example of FIG. 2, map 200 has shelf A 220, shelf B 230, shelf C 240, shelf D 250, shelf E 260 and shelf F 270. Each of shelves A 220 through F 270 have a number of cameras 212. For example, shelf A 220 has four cameras 212, each of the four cameras 212 positioned on one of the four sides of shelf A 220. Shelves B 230 through E 260 are similarly configured. Shelf F 270 has four cameras 212 positioned on one side because shelf F 270 is positioned against a boundary of map 200. Cameras 212 may be cameras 106 in data capture devices in FIG. 1. Points of sale 210 may be sales transaction devices 162 in model 150 in FIG. 1. Points of sale 210 may be sales transaction devices 107 in data capture devices 104 in FIG. 1. Shelves A 220 through F 270 may be locations 158 in map 152 of model 150 in FIG. 1. Entries 202 and 204 may be entries 164 in FIG. 1. Exits 206 and 208 may be exits 166 in map 152 of model 150 in FIG. 1.

Figure 3:
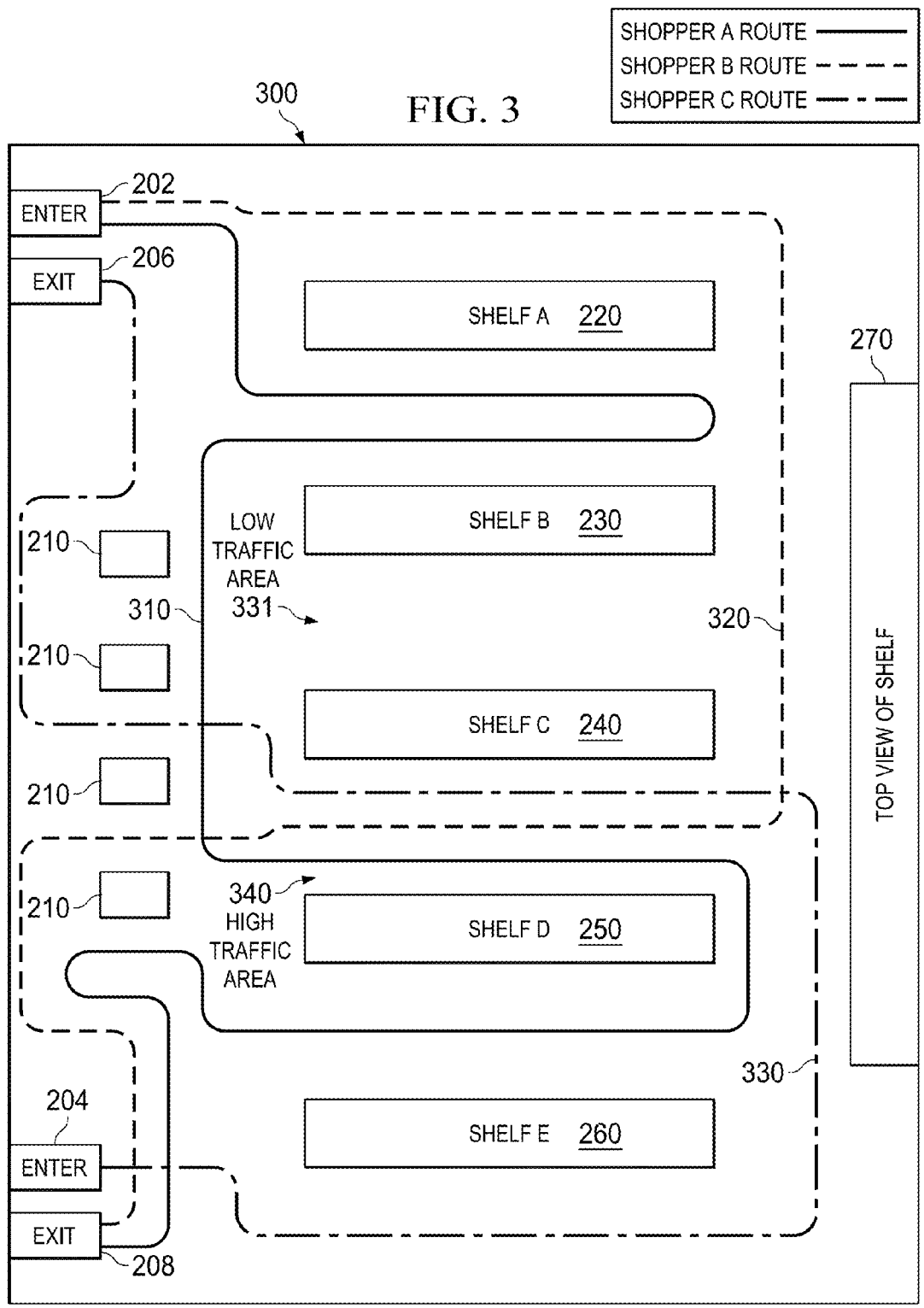
FIG. 3 is an illustrative example of a map with routes and high and low traffic areas in accordance with an illustrative embodiment.

Referring to FIG. 3, an illustrative example of map 300 with routes and high and low traffic areas is depicted in accordance with an illustrative embodiment. Map 300 has shopper route A 310, shopper route B 320, and shopper route C 330 depicted by broken lines. Low traffic area 331 is depicted on map 300 in an area that has not been crossed by route A 310, route B 320, or route C 330. High traffic area 340 designates an area on map 300 through which shopper route A 310, shopper route B 320, and shopper route C 330 pass through. Shopper route A 310, shopper route B 320, and shopper route C 330 may be routes 190 in customer data 180 in FIG. 1 and may have been determined by metric module 128 in FIG. 1.

Figure 4:
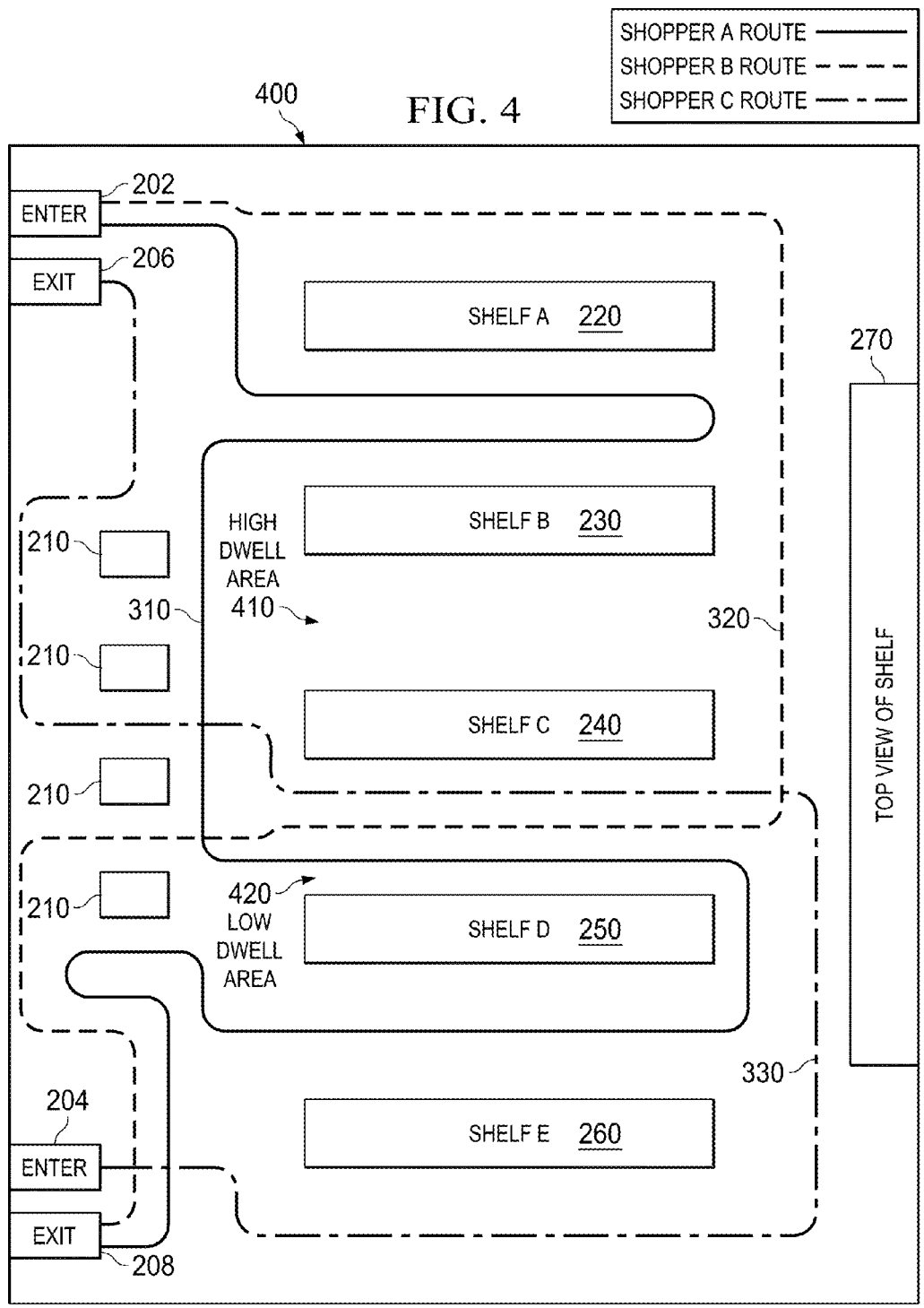
FIG. 4 is an illustrative example of a map with routes and high and low dwell areas in accordance with an illustrative embodiment.

Referring to FIG. 4, an illustrative example of map 400 with routes and high and low dwell areas is depicted in accordance with an illustrative embodiment. Map 400 depicts high dwell area 410 and low dwell area 420. High dwell area 410 indicates an area in which a customer has stopped and spent an amount of time in excess of a threshold looking at products. Low dwell area 420 indicates an area in which a customer has stopped and spent a time less than a threshold looking at products. In an illustrative example, high dwell area 410 corresponds to low traffic area 331 in FIG. 3. Such a condition may arise when customers pause in such numbers that they discourage other customers from entering the area. Such a condition may be identified as a distraction by audio and video analytics 130 and stored in distractions 196 in FIG.

1. In an illustrative example, low dwell 420 area corresponds to high traffic area 340. Such a condition may arise when the volume of traffic through high traffic area 340 discourages customers from stopping to look at displayed products. High dwell areas such as high dwell area 410 and low dwell areas such as low dwell area 420 may be located in any number of locations within a retail environment. Such a condition may be identified as a distraction by audio and video analytics 130 and stored in distractions 196 in FIG. 1. In these illustrative examples, audio and video analytics such as audio and video analytics in FIG. 1 may identify a number of high dwell areas and low dwell areas in a number of locations in a retail environment such a retail environment 100 in FIG. 1.

Figure 5:
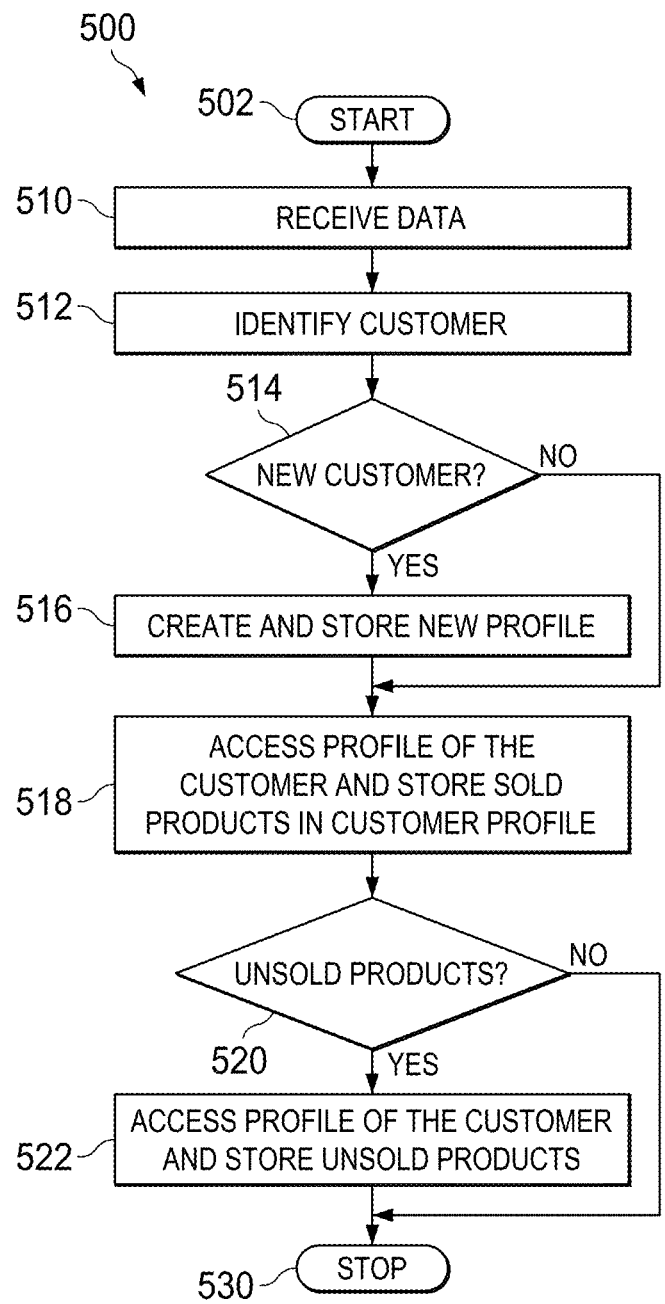
FIG. 5 is an illustration of a flowchart for customer identification in accordance with an illustrative embodiment.

Referring to FIG. 5, an illustration of a flowchart for customer identification is depicted in accordance with an illustrative embodiment. Customer identification may be performed by one of customer module 124 in FIG. 1. Process 500 starts (step 502) and receives data (step 510). Customer module 124 in FIG. 1 may receive data from data capture devices 104 and may access one or more of customer data 180, model 150, and table 140 in FIG. 1. Process 500 identifies a customer (step 512). Process 500 determines whether the customer is a new customer or whether the customer is a returning customer (step 514). Process 500 may determine whether the customer is a new customer, or a returning customer, by accessing customer data 180 in FIG. 1 to determine whether a customer profile is stored in customer data 180. If the customer is a new customer, process 500 creates and stores a new profile for the customer (step 516). Process 500 may store the new profile in profiles 182 in FIG. 1. If the customer already has a profile, process 500 accesses the profile of the customer and enters purchases made by the customer in the customer's profile (step 518). Purchases may be determined from sold products 192 in customer data 180 in FIG. 1. Process 500 determines whether there are any unsold products associated with the purchased products in an associated products file that were not purchased by the customer (step 520). The illustrative embodiments recognize and take into account that a number of ways may be used by process 500 to determine whether there are any products associated with the purchased products that were not sold to the customer. In an illustrative example, process 500 may access associated products 170 in model 150 in FIG. 1 and compare a product purchased by the customer with a list of products and associated products. If there are unsold products, the unsold products are entered in the profile for the customer (step 522). The profile may be profile 192 accessed by customer data 180 in FIG. 1. Unsold products may be stored in unsold products 194 in customer data 180 in FIG. 1. If there are no unsold products, process 500 stops (step 530).

Figure 6:
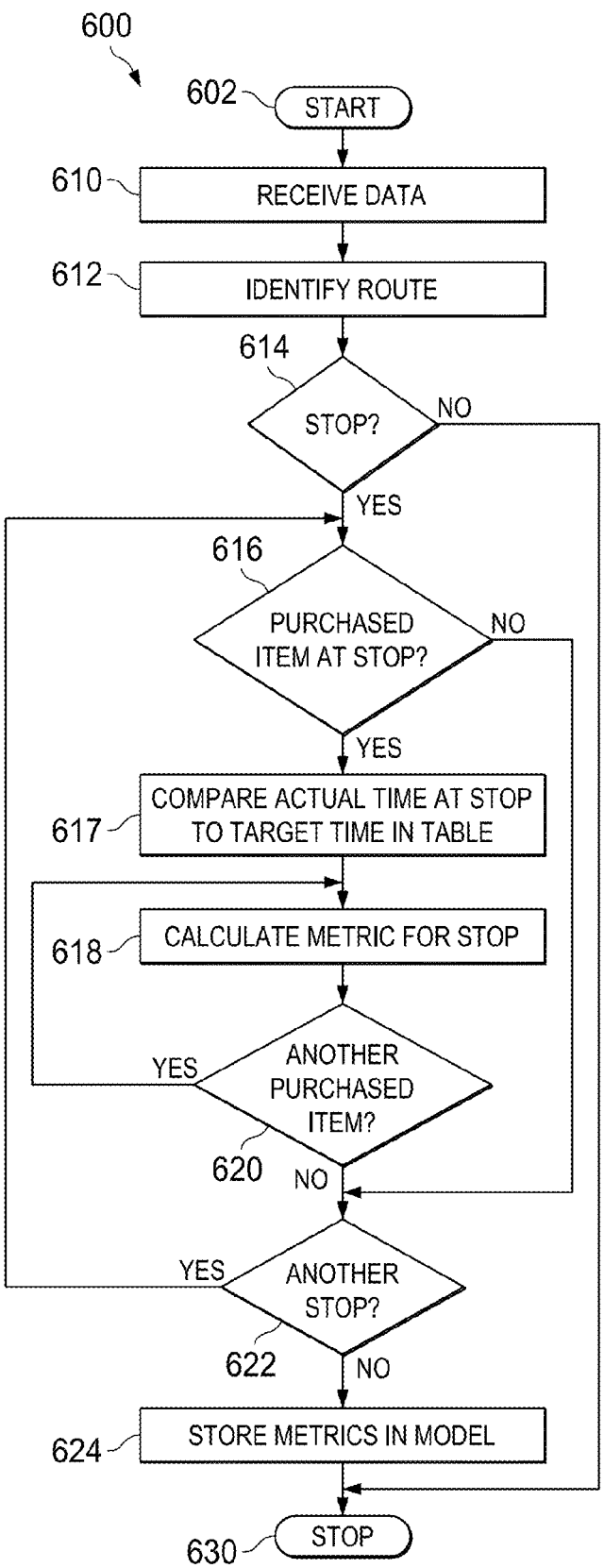
FIG. 6 is an illustration of a flowchart for calculation of metrics associated with customer stops in accordance with an illustrative embodiment.

Referring to FIG. 6, an illustration of a flowchart for calculation of metrics associated with customer stops is depicted. Calculation of metrics may be performed by one of metrics module 128 in FIG. 1. Process 600 starts (step 602) and receives data (step 610). Metrics module 128 in FIG. 1 may receive data from data capture devices 104 and may access one or more of customer data 180, model 150, and table 140 in FIG. 1. Process 600 identifies a route traveled by a customer (step 612). The illustrative embodiments recognize and take into account that a number of ways be employed by process 600 to identify a route traveled by the customer. In an illustrative example, process 600 receives data from data capture devices 104, and in particular, cameras 106 in FIG. 1. Cameras 106 may identify a particular customer using facial recognition and/or shape recognition technology. In addition, cameras 106 may take a series of photographs of the customer between the time that the customer enters the retail environment at an entrance and departs the retail environment at an exit. The entrance may correspond to one of entries 164 in map 152 of model 150 in FIG. 1. The exit may correspond to one of exits 166 in map 152 in model 150 in FIG. 1. Cameras 106 may take a continuous video and separate out photographs of the customer. Alternatively, cameras 106 may take a series of time stamped photographs of the customer. The time stamped photographs may be correlated to a camera's position in map 152 to create a route. The route may be stored in routes 190 in customer data 180. Process 600 determines whether the customer made a stop while traveling along the route (step 614). The illustrative embodiments recognize and take into account that a number of ways may be employed by process 600 to determine whether the customer made a stop while traveling along the route. In an illustrative example, process 600 may access sold products 192 in customer data 180 and locations 158 of products 154 in map 152 of FIG. 1. In the illustrative example, process 600 may employ a rule that any purchased product indicates a stop by the customer. In another illustrative example, process 600 may determine whether the customer made a stop by analyzing time stamps on the individual frames taken by cameras 106. If the customer did not stop while traveling along the route, process 600 stops (step 630). If the customer stopped while traveling the route, process 600 determines whether the customer purchased an item at the stop (step 616). In an illustrative example, process 600 may determine whether the customer purchased an item at the stop by comparing a product location for the product in locations 158 of products 154 in map 152 in FIG. 1 to sold products for the customer in sold products 192 in customer data 180. If not, process 600 goes to step 622. If the customer purchased an item at the stop, process 600 compares an actual time spent by the customer at the stop to a target time for the stop (step 617). In an illustrative embodiment, Process 600 may access table 140 in FIG. 1 to obtain a target stop time from target stop times 142 for the stop and an actual stop time in actual stop times 148 in table 140 in FIG. 1 Process 600 may then compare the target stop time and the actual stop time. Process 600 calculates a metric for the stop (step 618). In the illustrative embodiments, Process 600 determines if another item was purchased at the stop (step 620). If so, process 600 goes to step 618 and calculates another metric. If another item was not purchased, process 600 determines whether the customer made another stop (step 622). If the customer made another stop, process 600 goes to step 616. If the customer did not make another stop, process 600 stores the metric in the model (step 624) and stops (step 630). In an illustrative embodiment, the metric may be stored in metrics 172 in model 150 in FIG. 1.

Figure 7:
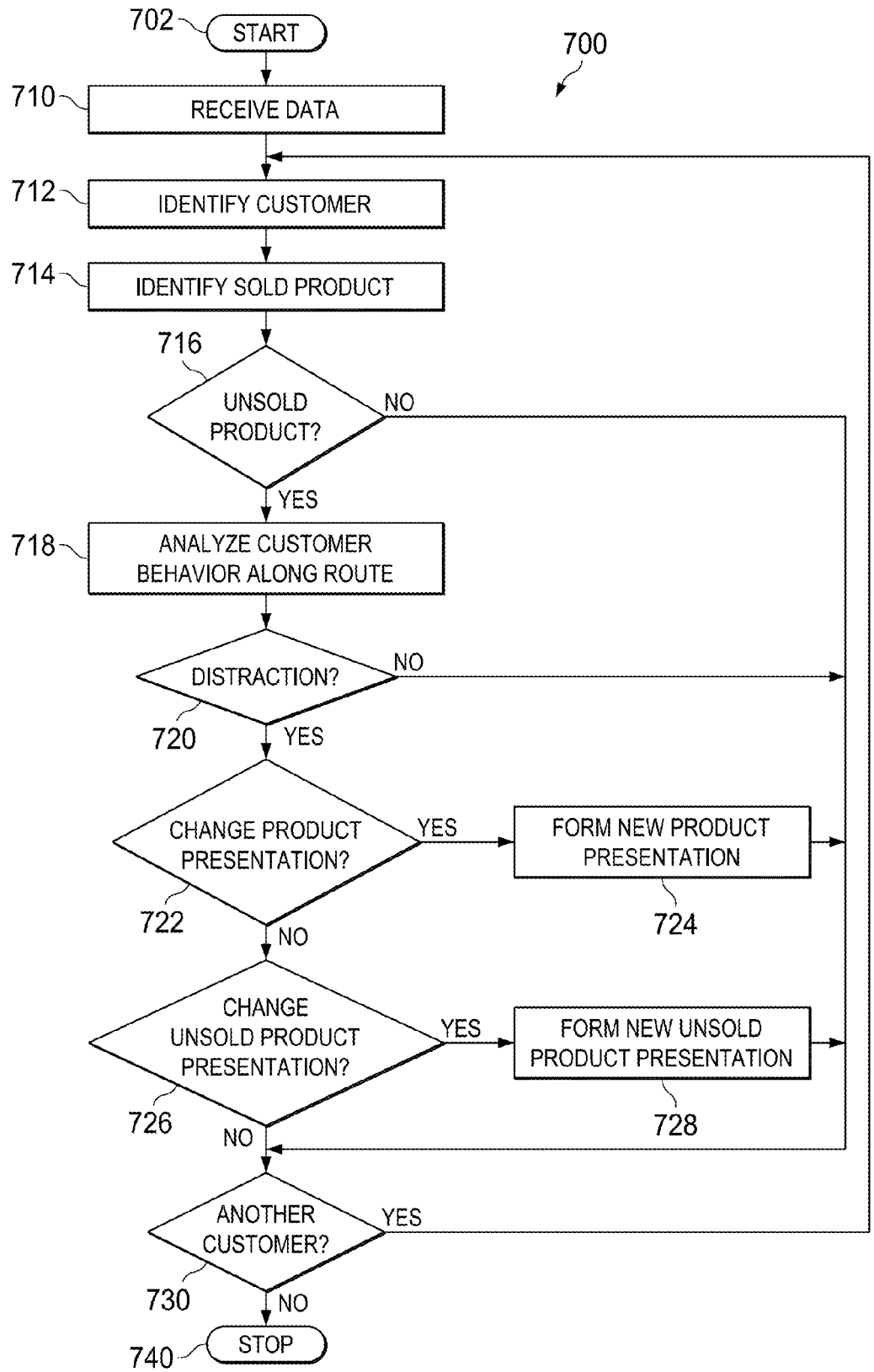
FIG. 7 is an illustration of a flowchart for analyzing unsold products in accordance with an illustrative embodiment.

Referring to FIG. 7, an illustration of a flowchart for analyzing unsold products is depicted in accordance with an illustrative embodiment. Analyzing unsold products may be performed by product module 126 in FIG. 1. Process 700 is an illustrative example of one process employed by product module 126 in FIG. 1. Process 700 starts (step 702) and receives data (step 710). Product module 126 in FIG. 1 may receive data from data capture devices 104 and may access one or more of customer data 180, model 150, and table 140 in FIG. 1. Process 700 identifies a customer (step 712). In an illustrative embodiment, process 700 may identify a customer by an identifier in profiles 182 of customer data 180. A unique identifier may be stored in profiles 182. A unique identifier may be assigned when cameras 106 identifies a customer using facial recognition technology or shape recognition technology. Process 700 identifies a product that has been sold to the customer (step 714). Process 700 determines whether any unsold product may be located along a route of the customer (step 716). In an illustrative embodiment, process 700 may access unsold products 194 and routes 190 for a particular customer in customer data 180. Process 700 analyzes customer behavior along the route (step 718). Responsive to analyzing customer behavior along the route, process 700 determines whether a distraction can be identified (step 720). In these examples customer behavior may be analyzed from data received from cameras 106 and sales transaction devices 107 in FIG. 1. In an illustrative embodiment, process 700 may parse data in customer data 180 to determine whether the customer stops were high value stops in high value 186 or low value stops in low value 188 in stops 184 of customer data 180. Process 700 may further compare metrics in metrics 172 for the stops. Process 700 may further compare stop values, metrics and presentation of product in presentations 174 to determine whether an actual behavior of the customer departed from an expected behavior. Expected behavior may be expected behavior 183 in FIG. 1. Actual behavior may be actual behavior 185 in FIG. 1. In these examples, an expected behavior may be that the customer buying a sold product such as may be in sold products 192 would be expected to also buy an associated product which may be an unsold product in unsold products 194 in FIG. 1. Furthermore, an example of an expected behavior may be that a customer may take a particular route through a high dwell area such as high dwell area 410 in FIG. 4. Moreover, an expected behavior may be that a customer buys a product target such as may be in product targets 145 and meet a target stop time such as may be in target stop times 142 in FIG. 1. The illustrative embodiments recognize and take into account that a number of expected behaviors may be designed from elements in table 140, model 150, and customer data 180 in FIG. 1. If the customer departed from an expected behavior, data from cameras 106 may be parsed to track the customer's head and eye movements to isolate a particular departure from expected behavior. An isolated departure from expected behavior may be identified as a distraction. A customer may be distracted from making an expected purchase for a number of reasons. A customer may be distracted by completing promotional materials. For example, a customer may leave a stop location to go to a different location in response to a promotion for an unrelated product made over a loudspeaker system. A customer may be distracted by difficulty in finding a purchased product. For example, a customer may have difficulty in finding a product because it is too high or too low on a shelf fixture. A customer may also be distracted as discussed above in regard to FIG. 4. Audio and video analytics such as audio and video analytics 130 in FIG. 1 may be used to determine whether a customer was distracted from making a purchase of an unsold product. In an illustrative example, the distraction may be stored in distractions 196 in customer data 180. In these illustrative examples, actual customer behavior may include actually picking up a product with an apparent intent to purchase the product and then not following through by actually buying the product at a sales transaction device. Audio and video analytics such as audio and video analytics 130 in FIG. 1 may analyze a customer's movements in relation to a product in order to further determine that a customer appeared to be distracted from a purchase and to identify a distraction. In these illustrative examples, a customer may stop at a location in the retail environment for a period of time but not buy a product in that location that the customer would be expected to buy in accordance with expected behavior 183 in FIG. 1, Audio and video analytics such as audio and video analytics 130 in FIG. 1 may determine that a distraction may have discouraged the customer from making the expected purchase. Furthermore, in these illustrative examples, a customer may stop at a location in the retail environment for a period of time but not buy a product in that location that the customer would be expected to buy in accordance with expected behavior 183 in FIG. 1, and then move on to another location and buy a product at that location. When the customer buys the product at the sales transaction device, audio and video analytics may "backtrack" along the frames captured of the customer route to determine the product that the customer was expected to buy but that the customer did not buy, and further determine whether such failure to buy was due to a distraction. Responsive to a distraction being identified, process 700 determines whether a change in product presentation may remove the distraction (step 722). If a change in product presentation may lessen or remove the distraction, process 700 forms a new product presentation (step 724) and process 700 goes to step 730. If a change in product presentation will not eliminate the distraction, a determination is made whether a change in the unsold product presentation may lessen or remove the distraction (step 726). If a change in the unsold product presentation may lessen or remove the distraction, a new unsold product presentation is formed (step 728). A determination is made whether there is another customer (step 730). If so, process 700 goes to step 712, and if not, process 700 stops (step 740).

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes may be performed in the reverse order, depending upon the functionality involved. Also, other blocks may be added in addition to the illustrated blocks in a flowchart or block diagram.

Thus, using programs 122, table 140, model 150, and customer data 180 as shown in FIG. 1, customer module 124, product module 126, and metric module 128 may eliminate one or more distractions 196 from routes 190 to improve presentations 174 of products in retail environment 100. Managers of retail environments such as retail environment 100 may assign values such as high value 186 and low value 188 to stops 184 for calculating metrics 172. Managers of retail environments such as retail environment 100 may use metrics to adjust presentation of products in real time. For example, a graphical user interface may be provided that identifies stops for individual customers and/or dwell locations for a number of customers over a period of time. Such identifications may be displayed along with actual and target revenues for the stops and/or dwell locations. In addition, slider bars, or other devices to allow the manager to adjust stop times or dwell times for use with a sliding scale metric formula, may be provided. Dwell time in dwell locations of high revenue may be set higher. High profit items may be moved to high value stops and/or dwell locations. For example, dwell time in areas of high revenue and or high profit items would be set higher, and dwell time for low price or low profit products would be set lower. The impact of low traffic areas such as low traffic areas 331 in FIG. 3 and the impact of high traffic areas such as high traffic areas 340 in FIG. 3 may be taken into account in calculating metrics and in adjusting map 152 in FIG. 1. Furthermore, in these examples, metrics may be designed by the manager of retail environment 100 by combining in a formula one or more of sold products 192, unsold products 194, high value 186, low value 188, distractions 196, target stop times 142, values 144, product targets 145, categories 146, actual stop times 148, associated product targets 147, routes 190, presentations 174, sales transaction devices 162, exits 166, and entries 164 in FIG. 1. The metrics may be stored in model 150 and/or linked to table 140. Analytics based on data capture of both dwell time and actual purchases at sales transaction devices may trigger process alarms to the retailer when the dwell time and actual purchases are out of predefined targets. Examples of situations in which a manager may desire to make a change may be when there is low dwell time for high value products, when there is high dwell time for low value products, and/or when there is high dwell time but low corresponding purchases at the sales transaction devices.

In addition, using programs 122, table 140, model 150, and customer data 180 as shown in FIG. 1, customer module 124, product module 126, and metric module 128 may generate real time reports showing both poor dwell time and poor stop time correlation to sales at sales transaction devices. Moreover, when stops or dwell locations are determined to be high value "hot spots," corrective action may be taken on presentation by including signage, promotions, and product relocation in order to emulate the successful dwell locations and/or stops. For example, potential additional promotion material for a product may be identified in advance and automatically placed into use upon a metric threshold being met or exceeded when the product is identified as an unsold product.

In addition, using programs 122, table 140, model 150, and customer data 180 as shown in FIG. 1, customer module 124, product module 126, and metric module 128 may identify buyer behavior that does not correspond with the expected purchase of associated products such as associated products 174. Determinations may be made whether some percentage of customers were distracted and drawn to something that caused the customer to inadvertently pass by the unsold product that the customer was expected to purchase. Traffic placement and product placement may be analyzed to determine what may have deterred the customer from making the expected combined purchase of the product and associated product. Alternatively, traffic placement and product placement may be analyzed to determine what may have caused the customer to make the expected combined purchase of the product and associated product so that successful techniques may be replicated for other product combinations. For example, video analytics may show cases where a customer did not see a product the customer was expected to purchase because the product was too high or too low on a shelf. In addition, the customer may have been distracted by a store announcement or a promotion for another product. In these examples, a distraction by a store announcement may be determined from audio data in video and audio analytics 130. Audio data at a particular recorded time may be correlated with video captured at the particular time to determine whether the announcement distracted the customer. Further, video analytics may determine that an expected purchase was missed due to inaccessibility of the product that is subject of the expected sale due to a physical limitation of the customer.

In addition, using programs 122, table 140, model 150, and customer data 180 as shown in FIG. 1, customer module 124, product module 126, and metric module 128 may allow managers of retail environments such as retail environment 100 to track the positive impact of signage and promotions by measuring an interaction of dwell time and sales at sales transaction devices so that such positive impact may be applied at other locations in the retail environment. Alternatively, managers of retail environments such as retail environment 100 may track the negative impact of signage and promotions by measuring the interaction of dwell time and sales at sales transaction devices so that promotional techniques may be adjusted or eliminated.

Turning now to FIG. 8, an illustration of a data processing system is depicted in accordance with an advantageous embodiment. In this illustrative example, data processing system 800 includes communications framework 802, which provides communications Data processing system 800 may be one of data processing systems 102 in FIG. 1 and may comprise processor unit 804, memory 806, persistent storage 808, communications unit 810, input/output (I/O) unit 812, and display 814. Processor unit 804 may be processors 110 in FIG. 1. Memory 806 may be memories 112 in FIG. 1. Persistent storage 808 may be storage 120 in FIG. 1. Communications unit 810, input/output (I/O) unit 812, and display 814 may be connected to processors 110 and memories 112 as well as storage 120 by networks 114 and interfaces 116 in FIG. 1.

Processor unit 804 serves to execute instructions for software that may be loaded into memory 806. Processor unit 804 may be a number of processors, a multi-processor core, or some other type of processor, depending on the particular implementation. A number, as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communication links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. In these illustrative examples, the instructions are in a functional form on persistent storage 808. These instructions may be loaded into memory 806 for execution by processor unit 804. The processes of the different embodiments may be performed by processor unit 804 using computer implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808. The computer usable program code, or computer readable program code, may comprise programs 122, customer module 124, product module 126, and metric module 128, of program 122 in FIG. 1.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826. Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 102. In some instances, computer readable storage media 824 may not be removable from data processing system 800. In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communication links, such as wireless communication links, optical fiber cable, coaxial cable, a wire, and/or any other suitable type of communications link. In other words, the communications link and/or the connection may be physical or wireless in the illustrative examples.

In some advantageous embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different advantageous embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 818 may be omitted because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications framework 802 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 806, or a cache, such as found in an interface and memory controller hub that may be present in communications framework 802.

Figure 9:
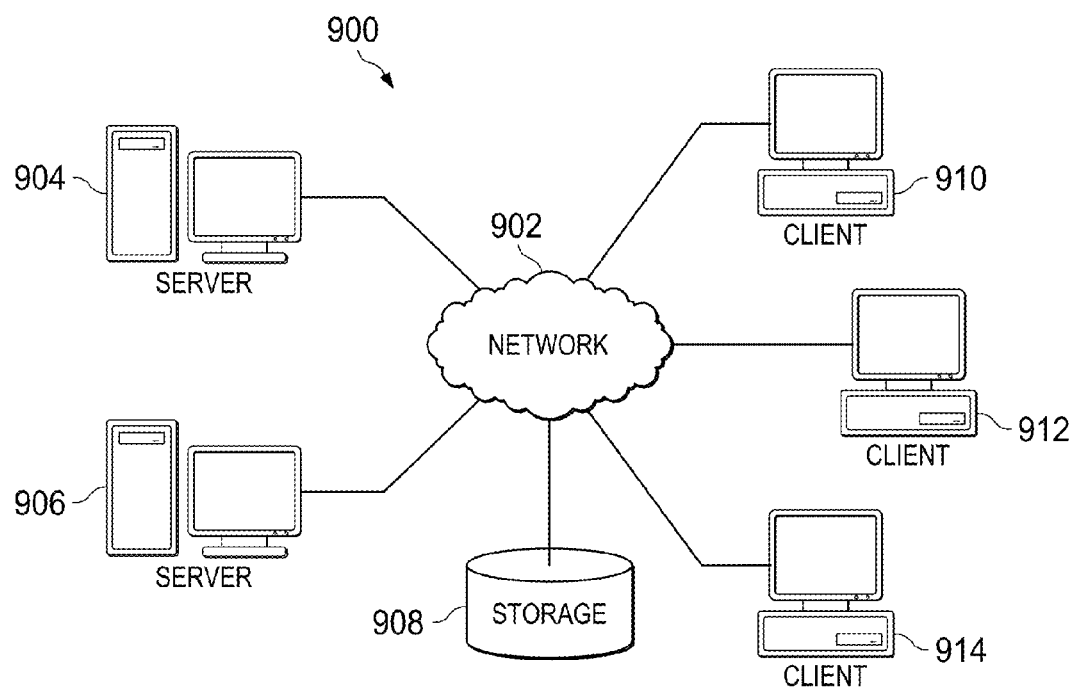
FIG. 9 is a pictorial representation of a network of data processing systems in accordance with an illustrative embodiment.

FIG. 9 depicts a pictorial representation of a network of data processing systems in which illustrative embodiments may be implemented. Network data processing system 900 is a network of computers in which the illustrative embodiments may be implemented. Network data processing system 900 contains network 902, which is the medium used to provide communications links between various devices and computers connected together within network data processing system 900. Network 902 may include connections, such as wire, wireless communication links, or fiber optic cables.

In the depicted example, server computer 904 and server computer 906 connect to network 902 along with storage unit 908. In addition, client computers 910, 912, and 914 connect to network 902. Client computers 910, 912, and 914 may be, for example, personal computers or network computers. In the depicted example, server computer 904 provides information, such as boot files, operating system images, and applications to client computers 910, 912, and 914. Client computers 910, 912, and 914 are clients to server computer 904 in this example. Network data processing system 900 may include additional server computers, client computers, and other devices not shown. Storage unit 908 may be storage 120 in FIG. 1. Client computers 910, 912, and 914, as well as server computer 90, may be data processing system 102 in FIG. 1.

Program code located in network data processing system 900 may be stored on a computer recordable storage medium and downloaded to a data processing system or other device for use. For example, program code may be stored on a computer recordable storage medium on server computer 904 and downloaded to client computer 910 over network 902 for use on client computer 910. In the depicted example, network data processing system 900 is the Internet with network 902 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 900 also may be implemented as a number of different types of networks, such as, for example, an intranet, a local area network (LAN), or a wide area network (WAN). FIG. 9 is intended as an example, and not as an architectural limitation for the different illustrative embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The invention claimed is:

1. A method for managing product presentations in a retail environment, the method comprising:
responsive to a customer buying a product, identifying, by a computer system in real time, an unsold product present along a route traversed by the customer in the retail environment and an actual behavior of the customer while traversing the route, wherein the unsold product is associated with the product in a relationship in which an associated product is likely purchased when the product is purchased and is identified, as not purchased by the customer, in an associated products file portion of customer data for the customer and with an expected customer behavior identified from the customer data to purchase the unsold product based on an actual purchase of the product by the customer;
responsive to a non-purchase of the unsold product identified, storing, by said computer system, information for the non-purchased unsold product identified in a customer profile; and
responsive to determining the non-purchase of the unsold product identified is due to a distraction forming, by said computer system, a new product presentation in real time.

2. The method of claim 1 further comprising:
responsive to identifying the unsold product, analyzing the actual behavior of the customer while traversing the route;
responsive to analyzing the actual behavior of the customer while traversing the route, determining a distraction using the unsold product; and
responsive to determining the distraction, changing a current presentation including one or more of counters, shelves and displays of one of the product and the unsold product in a model of the store to a new presentation in the model to eliminate the distraction.

3. The method of claim 1 wherein forming a new product presentation in real time further comprises:
responsive to identifying the unsold product, creating an instruction to initiate a real time promotional technique, wherein the real time promotional technique is one of a set of predetermined promotional techniques automatically placed into use upon a threshold of a respective metric being met or exceeded when the product is identified as the unsold product.

4. The method of claim 2 further comprising:
responsive to changing, by the computer system, the current presentation of one of the product and the unsold product to the new presentation in the model, creating a message to change an actual presentation of one of the product and the unsold product in the store to correspond to the new presentation in the model.

5. The method of claim 1 further comprising:
identifying the customer using a camera and a facial recognition algorithm;
associating the customer identified with an identifier in a customer profile; and
capturing data corresponding to the route traversed by the customer within the store, stops made by the customer along the route, and for each of the stops, a time spent by the customer at the stop.

6. The method of claim 5 further comprising:
using the data, calculating metrics for the stops; and
using the metrics, determining whether increasing a dwell time at a stop will increase a number of purchases of one of the product and the unsold product.

7. The method of claim 6 further comprising:
tracking a number of interactions of a display, a number of times at the stop, and a number of purchases of the product by the customer over a number of visits by the customer to the store;
analyzing the number of interactions to determine whether the display has a negative impact on the number of purchases,
responsive to determining that the display has the negative impact, adjusting one or more promotional techniques employed in the display at the stop.

8. A computer system comprising:
a bus system;
a number of cameras connected to the bus system;
a storage device connected to the bus system, wherein the storage device includes data received from the number of cameras and computer executable program code;

a processor unit connected to the bus system, wherein the processor unit executes the computer executable program code to direct the computer system to;
in response to a customer buying a product, identify, by a computer system in real time, an unsold product present along a route traversed by the customer in the retail environment and an actual behavior of the customer while traversing the route, wherein the unsold product is associated with the product in a relationship in which an associated product is likely purchased when the product is purchased and is identified, as not purchased by the customer, in an associated products file portion of customer data for the customer and with an expected customer behavior identified from the customer data to purchase the unsold product based on an actual purchase of the product by the customer
responsive to a non-purchase of the unsold product identified, store information for the non-purchased unsold product identified in a customer profile; and
responsive to determining the non-purchase of the unsold product identified is due to a distraction, form a new product presentation in real time.

9. The computer system of claim 8, wherein the processor unit executes the computer executable program code to further direct the computer system to;
responsive to identifying the unsold products, analyze the actual behavior of the customer while traversing the route;
responsive to analyzing the actual behavior of the customer while traversing the route, determine a distraction using the unsold product; and
responsive to determining the distraction, change a current presentation of one of the product and the unsold product in a model of the store to a new presentation in the model to eliminate the distraction.

10. The computer system of claim 8, wherein the processor unit executes the computer executable program code to form a new product presentation in real time further directs the computer system to:
responsive to identifying the unsold product, create an instruction to initiate a real time promotional technique, wherein the real time promotional technique is one of a set of predetermined promotional techniques automatically placed into use upon a threshold of a respective metric being met or exceeded when the product is identified as the unsold product.

11. The computer system of claim 8, wherein the processor unit executes the computer executable program code to further direct the computer system to:
responsive to changing the current presentation of one of the product and the unsold product to the new presentation in the model, create a message to change an actual presentation including one or more of counters, shelves and displays of one of the product and the unsold product in the store to correspond to the new presentation in the model.

12. The computer system, of claim 8, wherein the processor unit executes the computer executable program code to further direct the computer system to:
identify the customer using a camera and a facial recognition algorithm;
associate the customer identified with an identifier in a customer profile; and
capture data corresponding to the route traversed by the customer within the store, stops made by the customer along the route, and for each of the stops, a time spent by the customer at the stop.

13. The computer system of claim 12, wherein the processor unit executes the computer executable program code to further direct the computer system to:
using the data, calculate metrics for the stops; and
using the metrics, determine whether increasing a dwell time a stop will increase a number of purchases of one of the product and the unsold product.

14. The computer system of claim 13, wherein the processor unit executes the computer executable program code to further direct the computer system to:
track a number of interactions of a display, a number of times at the stop, and a number of purchases of the product by the customer over a number of visits by the customer to the store;
analyze the number of interactions to determine whether the display has a negative impact on the number of purchases; and
responsive to determining that the display has the negative impact, adjust one or more promotional techniques employed in the display at the stop.

15. A computer program product for managing product presentations in a retail environment, the computer program product comprising:
a computer readable tangible storage device having computer executable program code stored thereon, the computer executable program code comprising:
computer executable program code, responsive to a customer buying a product, identifying, by a computer system in real time, an unsold product present along a route traversed by the customer in the retail environment and an actual behavior of the customer while traversing the route, wherein the unsold product is associated with the product in a relationship in which an associated product is likely purchased when the product is purchased and is identified, as not purchased by the customer, in an associated products file portion of customer data for the customer and with an expected customer behavior identified from the customer data to purchase the unsold product based on an actual purchase of the product by the customer
computer executable program code responsive to a non-purchase of the unsold product identified, for storing information for the non-purchased unsold product identified in a customer profile; and
computer executable program code responsive to determining the non-purchase of the unsold product identified is due to a distraction for forming a new product presentation in real time.

16. The computer program product of claim 15 further comprising:
computer executable program code, responsive to identifying the unsold products, to analyze the actual behavior of the customer while traversing the route;
computer executable program, responsive to analyzing the actual behavior of the customer while traversing the route, determining a distraction using the unsold product; and
computer executable program code, responsive to determining the distraction, to change a current presentation including one or more of counters, shelves and displays of one of the product and the unsold product in a model of the store to a new presentation in the model to eliminate the distraction.

17. The computer program product of claim 15 wherein computer executable program code for forming a new product presentation in real time further comprises:

computer executable program code, responsive to identifying the unsold product, to create an instruction to initiate a real time promotional technique, wherein the real time promotional technique is one of a set of predetermined promotional techniques automatically placed into use upon a threshold of a respective metric being met or exceeded when the product is identified as the unsold product.

18. The computer program product of claim 16 further comprising:

computer executable program code, responsive to changing the current presentation of one of the product and the unsold product to the new presentation in the model, to create a message to change an actual presentation of one of the product and the unsold product in the store to correspond to the new presentation in the model.

19. The computer program product of claim 15, further comprising:

computer executable program code to identify the customer using a camera and a facial recognition algorithm;

computer executable program code to associate the customer identified with an identifier in a customer profile; and computer executable program code to capture data corresponding to the route traversed by the customer within the store, stops made by the customer along the route, and for each of the stops, a time spent by the customer at the stop.

20. The computer program product of claim 19, further comprising:

computer executable program code, using the data, to calculate metrics for the stops;

computer executable program code, using the metrics, to determine whether increasing a dwell time at a stop will increase a number of purchases of one of the product and the unsold product;

computer executable program code to track a number of interactions of a display, a number of times at the stop, and a number of purchases of the product by the customer over a number of visits by the customer to the store;

computer executable program code to analyze the number of interactions to determine whether the display has a negative impact on the number of purchases; and computer executable program code, responsive to determining that the display has the negative impact, to adjust one or more promotional techniques employed in the display at the stop.

* * * * *